US012675607B2

(12) United States Patent
Chandra et al.

(10) Patent No.: US 12,675,607 B2
(45) Date of Patent: Jul. 7, 2026

(54) OBFUSCATING USER DATA VIA DIFFERENTIAL PRIVACY

(71) Applicant: Capital One Services, LLC, McLean, VA (US)

(72) Inventors: Niharendu Chandra, Glen Allen, VA (US); Abigail Tohline Wooden, New York, NY (US)

(73) Assignee: Capital One Services, LLC, McLean, VA (US)

( * ) Notice: Subject to any disclaimer, the term of this patent is extended or adjusted under 35 U.S.C. 154(b) by 209 days.

(21) Appl. No.: 18/343,995

(22) Filed: Jun. 29, 2023

(65) Prior Publication Data

US 2025/0005199 A1     Jan. 2, 2025

(51) Int. Cl.
*G06F 21/62*         (2013.01)
*G06F 21/64*         (2013.01)

(52) U.S. Cl.
CPC .......... *G06F 21/6254* (2013.01); *G06F 21/64* (2013.01); *G06F 2221/2125* (2013.01)

(58) Field of Classification Search
CPC ................. G06F 21/6254; G06F 21/64; G06F 2221/2125; G06F 21/6245
See application file for complete search history.

(56) References Cited

U.S. PATENT DOCUMENTS 10,430,605 B1 * 10/2019 Nerurkar ............... G06F 16/245
10,542,423 B1 *  1/2020 Chang .................... H04W 12/64

| | | | | |
|---|---|---|---|---|
| 11,388,195 | B1 * | 7/2022 | McCaffery | .......... H04L 63/1425 |
| 11,954,186 | B2 † | 4/2024 | Kalia | |
| 2007/0143289 | A1 * | 6/2007 | Dwork | ................ G06F 16/2455 |
| | | | | 707/999.009 |
| 2019/0356672 | A1 * | 11/2019 | Bondugula | ........... H04L 63/205 |
| 2021/0133350 | A1 * | 5/2021 | Kirti | .................... G06F 21/6245 |
| 2021/0141920 | A1 * | 5/2021 | Khurana | ................ G06F 21/31 |
| 2021/0243171 | A1 | 8/2021 | Ghazi et al. | |
| 2021/0243595 | A1 * | 8/2021 | Buck | ...................... G06F 21/604 |
| 2021/0319131 | A1 * | 10/2021 | Salomon | ........... G06F 16/24528 |
| 2022/0138300 | A1 * | 5/2022 | Manjunath | ............ G06F 21/316 |
| | | | | 340/575 |
| 2023/0058385 | A1 * | 2/2023 | Kalapatapu | ......... G06F 21/6245 |
| 2023/0137378 | A1 * | 5/2023 | Laterza | .................... G06F 40/40 |
| | | | | 726/26 |
| 2023/0298052 | A1 * | 9/2023 | Jones | ................. G06Q 30/0201 |
| | | | | 705/7.29 |
| 2024/0281558 | A1 * | 8/2024 | Carette | ................. H04L 63/205 |
| 2024/0330511 | A1 * | 10/2024 | Dandu | ................... G06V 40/10 |

\* cited by examiner
† cited by third party

*Primary Examiner* — Andrew Suh

(74) *Attorney, Agent, or Firm* — Harrity & Harrity, LLP

(57)     ABSTRACT

In some implementations, a device may receive a request for data, wherein the request is associated with one or more parameters. The device may obtain, based on receiving the request, the data. The device may generate, using the data, differentially private data via a differential privacy function that uses a privacy parameter to control a level of noise that is inserted into the data to generate the differentially private data, wherein the privacy parameter is based on the one or more parameters. The device may provide, in response to the request, the differentially private data.

20 Claims, 7 Drawing Sheets

100

125
Determine a privacy
parameter based on
the request

130
Obtain the
requested data

Data Management
Device

120
Determine whether the
request is permissible

100

135
Generate differentially private data, from the requested data, via a differential privacy function and the privacy parameter Data Management Device 140
The differentially private data Data Consumer Device

200

300

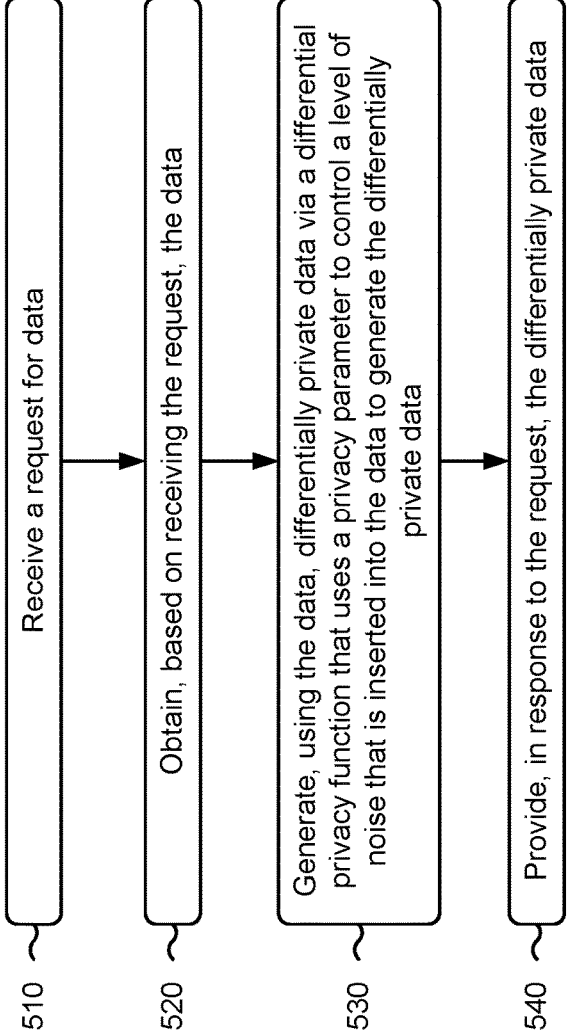

510 — Receive a request for data

520 — Obtain, based on receiving the request, the data

530 — Generate, using the data, differentially private data via a differential privacy function that uses a privacy parameter to control a level of noise that is inserted into the data to generate the differentially private data 540 — Provide, in response to the request, the differentially private data

OBFUSCATING USER DATA VIA DIFFERENTIAL PRIVACY

BACKGROUND

Differential privacy is a system for publicly sharing information associated with a dataset by describing the patterns of groups within the dataset (e.g., a distribution of data) while withholding information about individuals in the dataset. An algorithm may be referred to as a differentially private algorithm if an observer seeing output of the algorithm cannot tell if a particular individual's information was used to compute the output. Differential privacy is often discussed in the context of identifying individuals whose information may be in a database. Differentially private algorithms may be used, for example, to publish demographic information or other statistical aggregates while protecting confidentiality of responses, and/or to collect information about user behavior while controlling what information is visible.

SUMMARY

Some implementations described herein relate to a system for obfuscating user data via differential privacy. The system may include one or more memories and one or more processors communicatively coupled to the one or more memories. The one or more processors may be configured to receive, from a data consumer, a request for data, wherein the request is associated with one or more parameters. The one or more processors may be configured to obtain, based on receiving the request, the data. The one or more processors may be configured to determine, based on the one or more parameters, a privacy parameter associated with defining an accuracy level of differentially private data as compared to the data. The one or more processors may be configured to obfuscate the data via a differential privacy function that uses the privacy parameter to control a level of noise that is inserted into the data to generate the differentially private data, wherein the differentially private data is different than the data and is representative of the data within the accuracy level. The one or more processors may be configured to provide, in response to the request, the differentially private data.

Some implementations described herein relate to a method of obfuscating user data via differential privacy. The method may include receiving, by a device, a request for data, wherein the request is associated with one or more parameters. The method may include obtaining, by the device and based on receiving the request, the data. The method may include generating, by the device and using the data, differentially private data via a differential privacy function that uses a privacy parameter to control a level of noise that is inserted into the data to generate the differentially private data, wherein the privacy parameter is based on the one or more parameters. The method may include providing, by the device and in response to the request, the differentially private data.

Some implementations described herein relate to a non-transitory computer-readable medium that stores a set of instructions. The set of instructions, when executed by one or more processors of a device, may cause the device to receive a request for data, wherein the request is associated with one or more parameters and a data consumer. The set of instructions, when executed by one or more processors of the device, may cause the device to obtain, based on receiving the request, the data. The set of instructions, when executed by one or more processors of the device, may cause the device to determine, based on the one or more parameters, a privacy parameter associated with defining an accuracy level of differentially private data as compared to the data. The set of instructions, when executed by one or more processors of the device, may cause the device to obfuscate the data via a differential privacy function that uses the privacy parameter to control a level of noise that is inserted into the data to generate the differentially private data, wherein the differentially private data is different than the data and is representative of the data within the accuracy level. The set of instructions, when executed by one or more processors of the device, may cause the device to provide, in response to the request, the differentially private data.

BRIEF DESCRIPTION OF THE DRAWINGS

FIG. 5 is a flowchart of an example process associated with obfuscating user data via differential privacy, in accordance with some embodiments of the present disclosure.

DETAILED DESCRIPTION

Figure 1A:
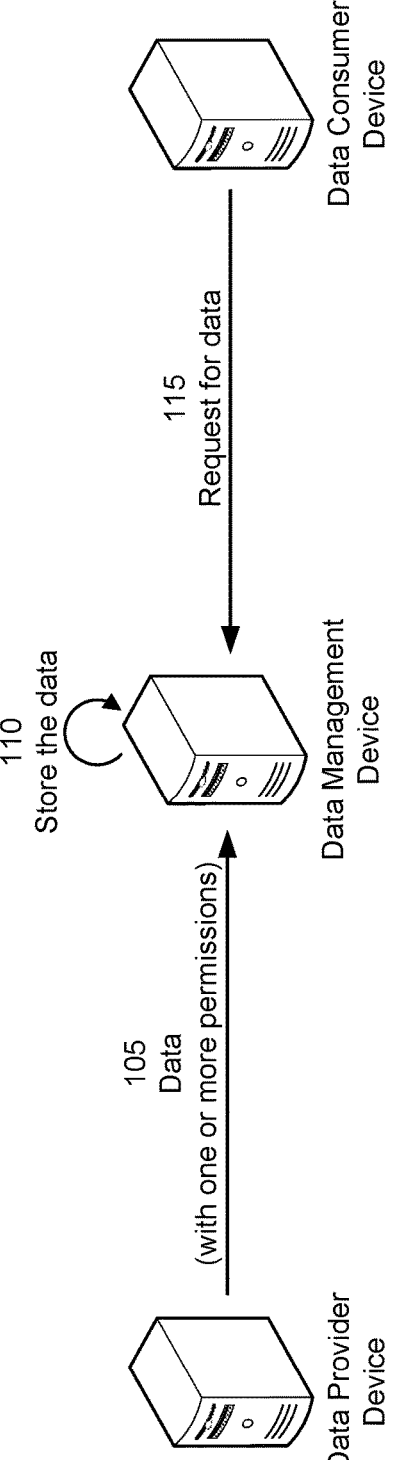
FIGS. 1A-1C are diagrams of an example associated with obfuscating user data via differential privacy, in accordance with some embodiments of the present disclosure.

The following detailed description of example implementations refers to the accompanying drawings. The same reference numbers in different drawings may identify the same or similar elements.

Differential privacy is a mathematical framework for protecting the privacy of individuals in datasets. Differential privacy can provide a strong guarantee of privacy by allowing data to be analyzed without revealing sensitive information about any individual in the dataset. Differential privacy can be used to protect sensitive data, such as personally identifiable information (PII), medical or health data, demographic data, financial data, education data, customer data, and/or confidential data, among other examples. For example, sensitive data in a true dataset (e.g., an actual dataset and/or a real dataset that contains real data about individuals or entities) can be kept private by generating a differentially private dataset with the same or similar statistical characteristics as the true dataset. However, using a generated differentially private dataset rather than a true dataset reduces the utility and accuracy of analyses performed on the differentially private dataset as compared to performing the same analyses on the true dataset.

A differential privacy function may inject controlled randomness into a dataset. The randomness serves as a privacy "noise" that makes it difficult to determine the presence or absence of an individual's data within the generated results. A differential privacy function may be associated with a privacy parameter (sometimes referred to as a privacy budget and/or denoted as $\varepsilon$). The privacy parameter determines the strength of the privacy guarantee of the differential privacy function, with smaller values of the privacy parameter corresponding to stronger privacy protection. The privacy parameter may be set using a mathematical formula which determines the amount of noise that needs to be added to data to achieve a certain level of privacy. Example differential privacy mechanisms include a Laplace mechanism, a noise addition mechanism, and/or a randomized response mechanism, among other examples.

A differential privacy mechanism may inject controlled noise into a dataset to protect the privacy of individual user data within the dataset. For example, the differential privacy mechanism may include a sensitivity calculation to determine the sensitivity of the differential privacy function. Sensitivity may refer to a maximum amount by which the output of the differential privacy function can change due to the addition or removal of a single individual's data. The differential privacy mechanism may include generating noise (e.g., via a Laplace distribution centered at zero ($\mu$=0) with a scale parameter determined by the sensitivity and the privacy parameter). The scale parameter may be defined as a ratio of the sensitivity to the privacy parameter. The generated noise may be added to a true output of the differential privacy function, resulting in a perturbed or randomized output. The noise may be added independently for each query or computation to ensure privacy. Each use (e.g., each query or calculation of the dataset) of the differential privacy mechanism may consume a portion of a privacy budget, which may be tracked to control privacy guarantees. The privacy budget may represent the cumulative privacy loss incurred through repeated queries or computations on the dataset. By limiting the privacy budget (typically to a value of the privacy parameter), the differential privacy mechanism protects that the overall privacy guarantee remains intact. As a value of the privacy parameter decreases, the privacy protection strengthens, but the amount of noise added to the dataset increases, impacting the utility or accuracy of the generated results.

In some cases, a data provider may receive, from a data consumer, a request for data. For example, the data consumer may be an entity that analyzes and/or otherwise uses the data to provide one or more products or services. The data provider may be an entity that collects and/or otherwise stores the data. Providing the requested data introduces security risks and/or privacy concerns for the individual user data within the data collected and/or otherwise stored by the data provider. For example, providing the true data and/or masked or anonymized data introduces a risk that data of a given individual may be obtained from the dataset. In some cases, the data provider may protect the privacy of individual user data within the data collected and/or otherwise stored using a differential privacy mechanism (e.g., when providing data to a data consumer). However, the data provider may receive requests for data from multiple data consumers and/or for different purposes. Using the differential privacy mechanism (e.g., the same differential privacy mechanism) to protect the privacy of the individual user data when providing data in response to all requests for data may result in increased privacy risks and/or decreased utility of the provided data.

For example, in some cases, a purpose for a request for data may need exact or true data and/or may need data having a given level of accuracy (as compared to the true data). If the differential privacy mechanism generates data that is different than the true data and/or data that has a level of accuracy that is less than the given level of accuracy, then the provided data may not be usable by the data consumer. For example, providing data that is different than the true data and/or data that has a level of accuracy that is less than the given level of accuracy may result in the data consumer performing one or more actions using the data (e.g., where the data is not accurate enough for a purpose of the one or more actions). This may consume processing resources, computing resources, and/or memory resources, among other examples, associated with performing the one or more actions. Additionally, or alternatively, if the differential privacy mechanism generates data that has a level of accuracy that is greater than the given level of accuracy, then the provided data may needlessly have the higher level of accuracy, thereby introducing a risk that data of a given individual may be obtained from the provided data.

Some implementations described herein enable obfuscation of user data via differential privacy. For example, a data management device may receive, from a data consumer, a request for data. The data management device may obtain, based on or in response to receiving the request, the data (e.g., indicated by the request). The data management device may obfuscate the data via a differential privacy function that uses a privacy parameter to control a level of noise that is inserted into the data to generate the differentially private data. The data management device may provide, in response to the request and to the data consumer, the differentially private data.

In some implementations, the data consumer and/or the request may be associated with one or more parameters. For example, the one or more parameters may include a request type associated with the request, a category associated with the data consumer, and/or a permission level associated with the data consumer, among other examples. The data management device may determine, based on the one or more parameters, the privacy parameter (e.g., where the privacy parameter is associated with defining an accuracy level of the differentially private data as compared to the data). For example, the generated differentially private data may be different than the data and may be representative of the data within the accuracy level. An amount of noise inserted or injected into the data to generate the differentially private data may be based on the one or more parameters.

As a result, by using the differential privacy function to obfuscate the data, a security and/or privacy of individual user data included in the data is improved. For example, the data provided by the data management device may be different than the actual data, where the difference is controlled via a rigorous mathematical framework to ensure the security and/or privacy of user data included in the data. Additionally, by determining or setting the privacy parameter based on the one or more parameters (e.g., the one or more parameters associated with the request and/or the data consumer), the data management device may ensure that the generated differentially private data has an accuracy level that ensures the security and/or privacy of user data while also ensuring that the differentially private data is usable and/or accurate enough for a purpose for which the data is requested. For example, this conserves processing resources, computing resources, and/or memory resources, among other examples, that would have otherwise been used by the data consumer performing one or more actions using differentially private data that is not accurate enough for a purpose for which data is requested. Additionally, this improves the security and/or privacy of user data by mitigating a risk that the data management provides differentially private data that is more accurate than necessary for the purpose for which data is requested.

Figure 1B:
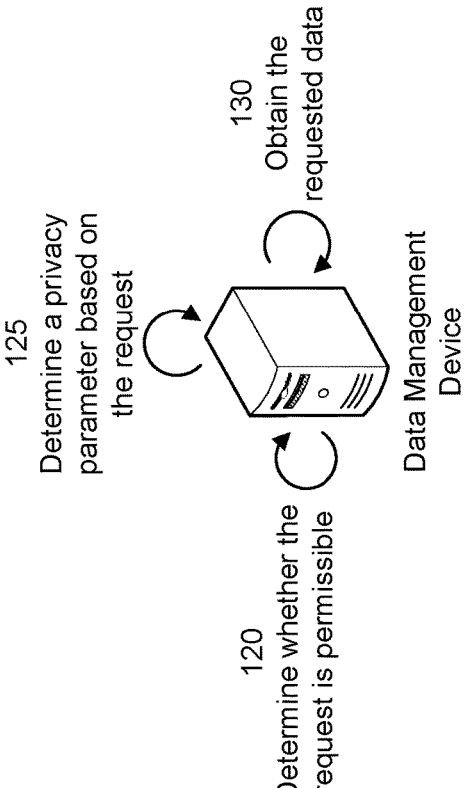
Figure 1C:
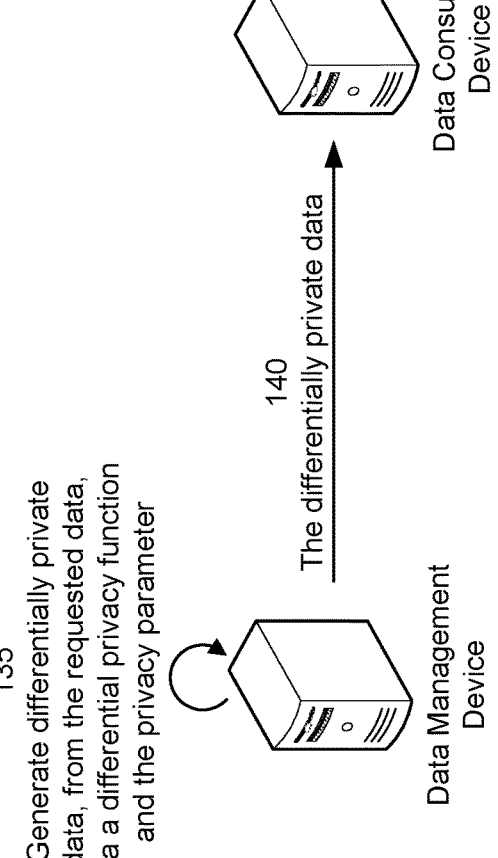

FIGS. 1A-1C are diagrams of an example 100 associated with obfuscating user data via differential privacy. As shown in FIGS. 1A-1C, example 100 includes a data provider device, a data management device, and a data consumer device. These devices are described in more detail in connection with FIGS. 3 and 4.

The data management device may be associated with an entity that collects and/or stores data (e.g., user data). For example, the data management device may be associated with an institution (e.g., a financial institution) that collects and/or stores user data associated with users of one or more products or services provided by the institution. The data provider device may be a device that provides user data. For example, the data provider device may be associated with a user or the institution that is associated with the data management device. The data consumer device may be associated with an entity that analyzes and/or otherwise uses the user data to provide one or more products or services. As an example, the data management device and the data consumer device may be associated with an open banking framework. Open banking is a concept that refers to the practice of sharing financial data between different financial institutions, third-party developers, and customers through standardized application programming interfaces (APIs). Open banking may increase competition, innovation, and/or consumer choice in the financial industry by enabling secure and controlled access to banking data. As another example, the data consumer device may be associated with a machine learning model. The data consumer device may request user data to train the machine learning model (e.g., where the user data is part of a training dataset for the machine learning model). In general, the data consumer device may be associated with an entity that requests user data for any purpose or application.

As shown in FIG. 1A, and by reference number 105, the data management device may obtain data (e.g., user data). For example, the data provider device may transmit, and the data management device may receive, the data. The data may be associated with user actions, user interactions, and/or information associated with a user, among other examples. For example, the data may include transaction data (e.g., a date, time, location, amount, entity, and/or other information associated with one or more transactions) that is associated with a user.

In some implementations, the data may be associated with one or more permissions. A permission may be associated with an authorization and/or consent granted by the user associated with the data. The authorization and/or consent may be associated with whether the data can be accessed and/or shared by third parties, such as the entity associated with the data consumer device. The authorization and/or consent may be associated with one or more control parameters specifying who can access the user data, for what purpose the user data can be accessed, one or more types of user data that can be accessed, a duration of the permission, one or more specific entities authorized to access the user data, and/or one or more restrictions or limitations on a use of the user data, among other examples. The data management device may refrain from sharing or providing the user data unless the one or more permissions indicate that the user associated with the user data has consented to the user data being shared. For example, the data management device may provide user data associated with the user to the data consumer device in accordance with the one or more permissions.

For example, the one or more permissions may include an indication of a purpose for which the data associated with the user can be shared and/or one or more restricted purposes for which the data associated with the user cannot be shared.

For example, the one or more permissions may indicate that the data can be shared for credit worthiness checks. As another example, the one or more permissions may indicate that the data cannot be shared for advertising or marketing purposes. The one or more permissions may include an indication of an accuracy level at which the data can be shared. For example, the one or more permissions may indicate that the data associated with the user can be shared with less than or equal to a X % accuracy, such as less than or equal to a 90% accuracy. In some implementations, the one or more permissions may include one or more location permissions. For example, the one or more location permissions may indicate whether the user data that is shared is permitted to include location data. Additionally, the one or more location permissions may indicate a permitted accuracy level of location data that is included in shared user data. For example, the one or more location permissions may indicate that the location data may have less than or equal to a N % accuracy. As another example, the one or more location permissions may indicate that the location data can be shared with an accuracy of plus or minus M kilometers or miles, such as plus or minus 5 kilometers or miles. As a result, the one or more permissions may provide greater control for the user of how the data associated with the user is shared in a differential privacy context. Providing greater control to the user over how the data is shared may result in a greater amount of data being shared because the user has more control over how the data is shared. This may result in greater access to data for data consumers while also ensuring the privacy and security of the data of an individual user.

As shown by reference number 110, the data management device may store the data. For example, the data management device may store user data in a dataset. The dataset may include user data associated with multiple users. In some implementations, the data management device may store the data based on the one or more permissions indicating that the data is permitted to be shared. For example, if the one or more permissions indicate that the data is not permitted to be shared, then the data management device may refrain from storing the data in the dataset. In some implementations, the data management device may store the data in a dataset that has access permissions that are in accordance with the one or more permissions. The data management device may store the data in a dataset that has access permissions that are at least as restrictive as the one or more permissions associated with the data (e.g., to ensure that the data is shared in accordance with the one or more permissions). For example, the data management device may store the data with other user data having the same or similar permissions.

As shown by reference number 115, the data management device may obtain or receive a request for data. The data management device may receive the request for data from the data consumer device. For example, the request for the data may be included in an API call. The request may indicate a type of data requested and/or a purpose for which the data is requested.

For example, the request may be associated with one or more parameters. The one or more parameters may include a request type associated with the request. The request type may indicate a purpose and/or a use for which the data is requested (e.g., a use of the data). For example, the request type may include advertising, marketing, credit checking, machine learning model training, balance verification (e.g., to verify funds associated with an account before initiating a payment), underwriting (e.g., to verify general creditworthiness or risk of a user), user data aggregation, and/or income verification, among other examples.

Additionally, or alternatively, the one or more parameters may include a category associated with the data consumer device (e.g., a category associated with the entity that is associated with the data consumer device). The category may include a trusted entity or a non-trusted entity. For example, the data management device may enable a trusted entity to access more accurate user data (e.g., user data with less noise inserted into the user data). As another example, the category may indicate a business, application, and/or service associated with the data consumer. For example, the category may be indicative of a purpose for which the data consumer device is requesting the data.

Additionally, or alternatively, the one or more parameters may include a permission level associated with the data consumer. For example, the permission level may indicate a permissioned level of risk tolerance associated with the data consumer. The permission level may indicate a level of accuracy of data that is permitted to be shared with the data consumer. In some implementations, the level of accuracy of data that is permitted to be shared with the data consumer may be associated with a request type or data type of the data requested (e.g., the permission level may indicate that the data consumer is associated with a first level of accuracy for a first request type and a second level of accuracy for a second request type). As an example, the data consumer may be permitted to access less accurate data for advertising purposes and more accurate data for underwriting purposes.

The request may indicate a type of data requested. For example, the one or more parameters may include the type of data requested (e.g., financial data, location data, transaction record data, or another type of data). In some implementations, the request may indicate a requested accuracy level of the data. For example, the one or more parameters may include the requested accuracy level. In some implementations, the request may indicate one or more users for which the data is requested.

As shown in FIG. 1B, and by reference number 120, the data management device may determine whether the request is permissible. For example, the data management device may determine whether the request is permissible based on the one or more parameters associated with the request. As an example, the data management device may determine whether the request type associated with the request is permissible or compatible with differential privacy data sharing. For example, some request types may be associated with exact or true data and/or an accuracy level that is greater than an accuracy threshold associated with differential privacy data sharing.

If the data management device determines that the request type is not permissible or compatible with differential privacy data sharing (e.g., because the request type is associated with requesting exact data, true data, and/or data with a high level of accuracy), then the data management device may refrain from generating differentially private data and/or from sharing data in response to the request. In such examples, the data management device may transmit, and the data consumer device may receive, a message that indicates that the request cannot be fulfilled. For example, the data management device may provide an error message in response to the request (e.g., via an API communication).

As shown by reference number 125, the data management device may determine a privacy parameter based on the request. The privacy parameter may be associated with a differential privacy function. The privacy parameter may define an accuracy level of generated differentially private data (e.g., generated via the differential privacy function) as compared to true data. For example, the privacy parameter may define an amount of noise inserted into the data via the differential privacy function.

The data management device may determine the privacy parameter based on the one or more parameters associated with the request. For example, the data management device may determine the accuracy level of generated differentially private data and/or amount of noise to be inserted into requested data (e.g., to generate the differentially private data) based on the one or more parameters associated with the request. For example, a request type may be associated with a given value for the privacy parameter. The given value may ensure that the differentially private data has an accuracy level that enables the differentially private data to still be useful for a purpose associated with the request type while still protecting the privacy of individual user data.

As another example, a category associated with the data consumer may be associated with a given value for the privacy parameter. For example, the data management device may determine that a trusted data consumer may be provided differentially private data associated with a first privacy parameter (e.g., having values that satisfy a first privacy parameter threshold). The data management device may determine that a non-trusted data consumer may be provided differentially private data associated with a second privacy parameter (e.g., having values that satisfy a second privacy parameter threshold).

The data management device may determine the privacy parameter based on the one or more permissions associated with the data. For example, the data management device may determine the privacy parameter such as the one or more permissions are met by the differentially private data that is generated using the privacy parameter. For example, the one or more permissions may indicate a permissible accuracy level. The data management device may determine the privacy parameter such as the differentially private data has an accuracy level that is less than or equal to the permissible accuracy level.

In other words, the data management device may determine the privacy parameter such that the differentially private data meets the one or more permissions provided by the user and is usable for a purpose associated with the request. In some implementations, the data management device may determine the privacy parameter to cause the differentially private data to have an accuracy level that meets the one or more permissions provided by the user and is usable for a purpose associated with the request. In some implementations, the data management device may determine the privacy parameter to cause the differentially private data to have a lowest possible accuracy level that meets the one or more permissions provided by the user and is usable for a purpose associated with the request. Reducing the accuracy of the differentially private data may improve the security and/or privacy of user data associated with the differentially private data.

As shown by reference number 130, the data management device may obtain the requested data. For example, the data management device may obtain the true or exact data indicated by the request. In some implementations, the data management device may obtain the data via a dataset and/or a database. For example, the data management device may query or search the dataset and/or the database to identify and/or obtain the data indicated by the request.

As shown in FIG. 1C, and by reference number 135, the data management device may generate differentially private data, from the requested data (e.g., data indicated by the request), via a differential privacy function and the privacy parameter. For example, the data management device may obfuscate the data via the differential privacy function that uses the privacy parameter to control a level of noise that is inserted into the data to generate the differentially private data. For example, the differentially private data may be different than the data (e.g., than the true data requested via the request) and may be representative of the data within an accuracy level associated with the privacy parameter.

The data management device may set the privacy parameter of the differential privacy function based on the determined privacy parameter, as described elsewhere herein. The data management device may input, to the differential privacy function, the data (e.g., the true data requested by the data consumer device). The data management device may obtain the differentially private data from an output of the differential privacy function.

In some implementations, the differentially private data may include noise inserted into the data. The noise that is inserted into the data may include one or more modifications to the data. For example, for numerical data, the noise may include using the differential privacy function to modify the numerical data to be different numerical (e.g., where the different numerical data is within an accuracy level of the numerical data). As an example, if the data includes an amount of $100,000 and the accuracy level is 90%, then the differentially private data may include an amount between $90,000 and $110,000 (e.g., plus or minus 10% difference from the true value of $100,000).

In some implementations, the data may include qualitative data or identifying data (e.g., non-numerical data). For example, the qualitative data or identifying data may include location data, a user name, and/or an entity name, among other examples. The data management device may generate the differentially private data such that the qualitative data or identifying data is changed, but is still reflective of the true data. For example, the data management device may generate, using the qualitative data, qualitative differentially private data that is different than the qualitative data. In some implementations, a difference between the qualitative data (e.g., the true data) and the qualitative differentially private data may satisfy an accuracy threshold. The accuracy threshold may be based on the privacy parameter and/or an accuracy level of the differentially private data. The difference may be a distance (e.g., between a first location indicated by the qualitative data and a second location indicated by the qualitative differentially private data).

For example, the qualitative data may include a location identifier, such as an address, a street address, a city, a town, and/or a zone improvement plan (ZIP) code, among other examples. The data management device may perform, using the location identifier, a lookup operation to identify one or more candidate location identifiers. For example, the data management device may search a location database that includes location identifiers and respective geographic locations associated with the location identifiers. The one or more candidate location identifiers are associated with respective geographic locations. A distance between the respective geographic locations and a geographic location associated with the location identifier may satisfy a distance threshold. For example, if the location identifier is a ZIP code (e.g., associated with a geographic location), then the data management device may perform a lookup operation (e.g., in a database) to identify candidate ZIP codes that are associated with candidate geographic locations that are located near the geographic location indicated by the ZIP code (e.g., that are within M kilometers or miles of the geographic location indicated by the ZIP code).

The data management device may select (e.g., randomly) a candidate location identifier (e.g., a differentially private location identifier) from the one or more candidate location identifiers. The data management device may include the selected candidate location identifier in the differentially private data in place of the location identifier. As a result, the differentially private data may include location information that is close to or representative of the true location information while also ensuring the privacy of the actual locations visited by the user associated with the data (e.g., the owner of the data).

As another example, the difference may be a difference in a semantic meaning. For example, the data management device may quantize a semantic meaning of the qualitative data and a semantic meaning of the qualitative differentially private data. For example, the data management device may generate a first one or more word embeddings associated with the qualitative data and a second one or more word embeddings associated with the qualitative differentially private data. The semantic difference between the qualitative data and the qualitative differentially private data may be measured as a distance (e.g., a cosine similarity or a Euclidean distance) between the first one or more word embeddings and the second one or more word embeddings.

In some implementations, the data may include identifying information associated with a user or an entity. For example, the identifying information may include a user's name (e.g., first name and last name) and/or a name of an entity (e.g., a vendor name). The data management device may determine a category associated with the identifying information. For example, the data management device may determine a category associated with the entity associated with the identifying information. For example, the category may include a grocery store, a coffee shop, a gas station, an online store, a sporting goods store, a restaurant (e.g., and/or a type of restaurant, such as an Italian restaurant for a restaurant that primarily serves Italian food), a financial institution, and/or a government institution, among other examples. As another example, if the identifying information is associated with a user, the category may include a gender, an age, and/or a race, among other examples.

In some implementations, the data management device may generate, based on the category associated with the identifying information, generic identifying information that identifies the category. For example, the generic identifying information may identify the category, but not the specific entity associated with the identifying information (e.g., a generic name). As an example, generic identifying information associated with an entity that sells coffee may be "coffee shop." As another example, if the identifying information is a user's name and the category is the gender of male, then the generic identifying information may be a generic male name, such as "John Doe." The differentially private data includes the generic identifying information in place of the identifying information.

In some implementations, the request for the data includes a request for one or more statistical parameters associated with the data. The data management device may calculate, using the data, the one or more statistical parameters. The data management device may obfuscate the one or more statistical parameters via the differential privacy function to generate one or more differentially private statistical parameters to be included in the differentially private data. For example, the data management device may be configured to obfuscate statistical parameters associated with user data to further enhance the security and/or privacy of the user data.

As shown by reference number 140, the data management device may provide, in response to the request, the differentially private data. For example, the data management device may transmit, and the data consumer device may receive, an indication of the differentially private data. For example, the data management device may provide or transmit the differentially private data via an API communication.

As indicated above, FIGS. 1A-1C are provided as an example. Other examples may differ from what is described with regard to FIGS. 1A-1C.

Figure 2:
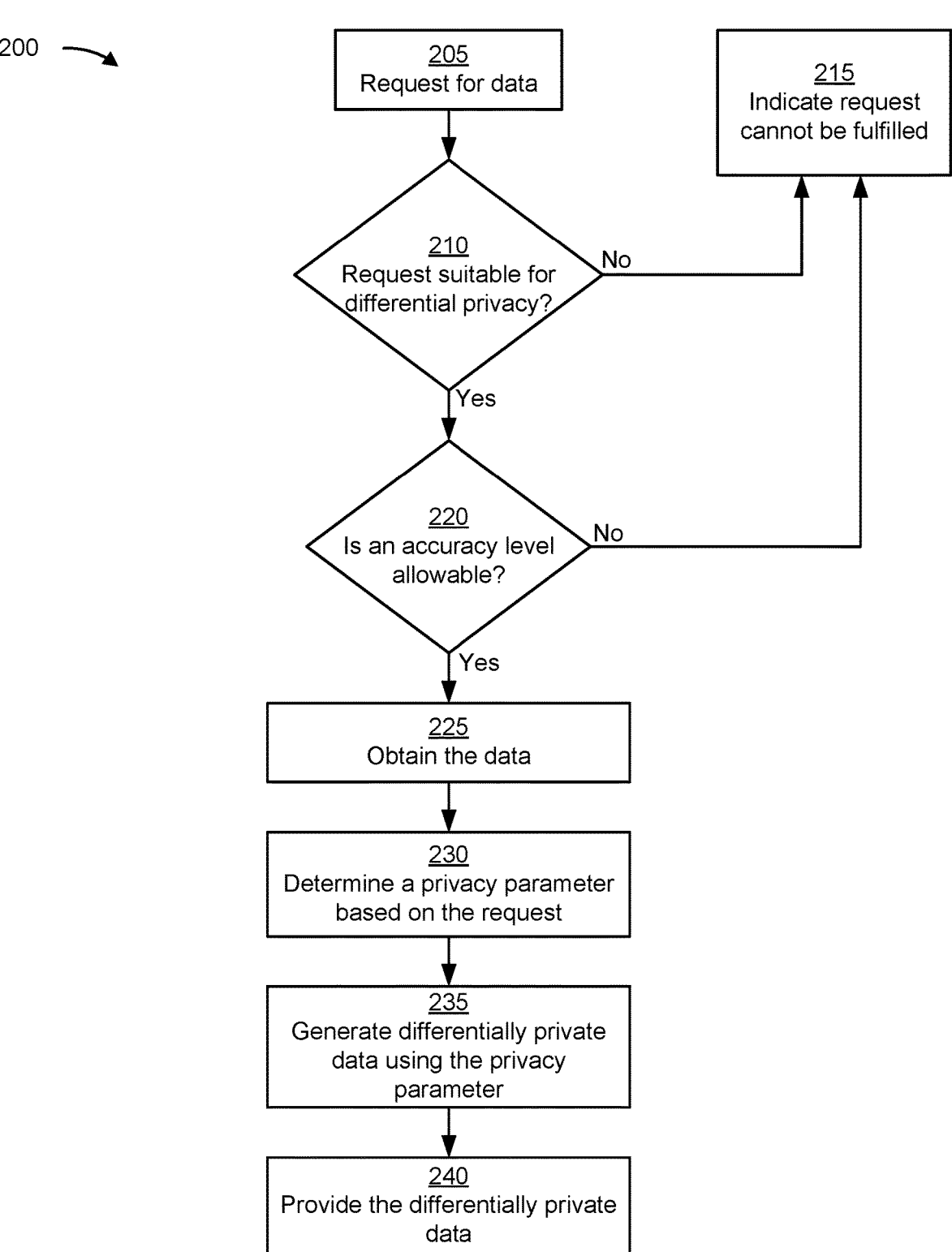
FIG. 2 are diagrams of an example process associated with obfuscating user data via differential privacy, in accordance with some embodiments of the present disclosure.

FIG. 2 are diagrams of an example process 200 associated with obfuscating user data via differential privacy. The blocks and/or operations described in connection with FIG. 2 may be performed by the data management device and/or another device described herein.

The process 200 may include obtaining a request for data (block 205). For example, the data management device may obtain a request for data, such as described in connection with reference number 115 and FIG. 1A. The process 200 may include determining whether the request is suitable for differential privacy (block 210). The data management device may determine whether the request is suitable for differential privacy in a similar manner as described in connection with reference number 120 and FIG. 1B. For example, the data management device may determine whether the request is suitable for differential privacy data sharing. In some implementations, the data management device may determine whether the request is associated with a request type or a use case where differential private data will be useful and/or suitable for the request type or the use case. If the data management device determines that the request is not suitable for differential privacy (block 210— No), then process 200 may include indicating that the request cannot be fulfilled (block 215). For example, the data management device may transmit a communication (e.g., to the device that transmitted the request) that indicates that the request cannot be fulfilled.

If the data management device determines that the request is suitable for differential privacy (block 210—Yes), then process 200 may include determining whether an accuracy level indicated by the request is allowable (block 220). For example, the data management device may determine whether an accuracy level (e.g., of requested data) indicated by the request satisfies a differential privacy threshold. The differential privacy threshold may be based on a differential privacy function used to generate the differentially private data and/or based on information associated with the request, such as a request type, a category of the data consumer, and/or a permission level associated with the data, among other examples. If the data management device determines that accuracy level is not allowable (block 220— No), then process 200 may include indicating that the request cannot be fulfilled (block 215).

If the data management device determines that accuracy level is allowable (block 220—Yes), then process 200 may include obtaining the data (block 225). For example, the data management device may obtain the data indicated by the request (e.g., from a dataset and/or a database). The process 200 may include determining a privacy parameter based on the request (block 230). For example, the data management device may determine the privacy parameter in a similar manner as described in connection with reference number 125 and FIG. 1B. For example, the privacy parameter may be based on information associated with the request and/or one or more permissions associated with the data (e.g., permissions indicated by an owner of the data).

The process 200 may include generating differentially private data using the privacy parameter (block 235). For example, the data management device may configure a differential privacy function to use the determined privacy parameter. The data management device may input the obtained data into the differential privacy function. The data management device may obtain the differentially private data via an output of the differential privacy function. The data management device may generate the differentially private data in a similar manner as described in connection with reference number 135 and FIG. 1C. The process 200 may include providing the differentially private data (block 240). For example, the data management device may provide, to a data consumer associated with the request, the differentially private data. As another example, the data management device may provide the differentially private data as an input to a machine learning model (e.g., associated with training the machine learning model).

As indicated above, FIG. 2 is provided as an example. Other examples may differ from what is described with regard to FIG. 2.

Figure 3:
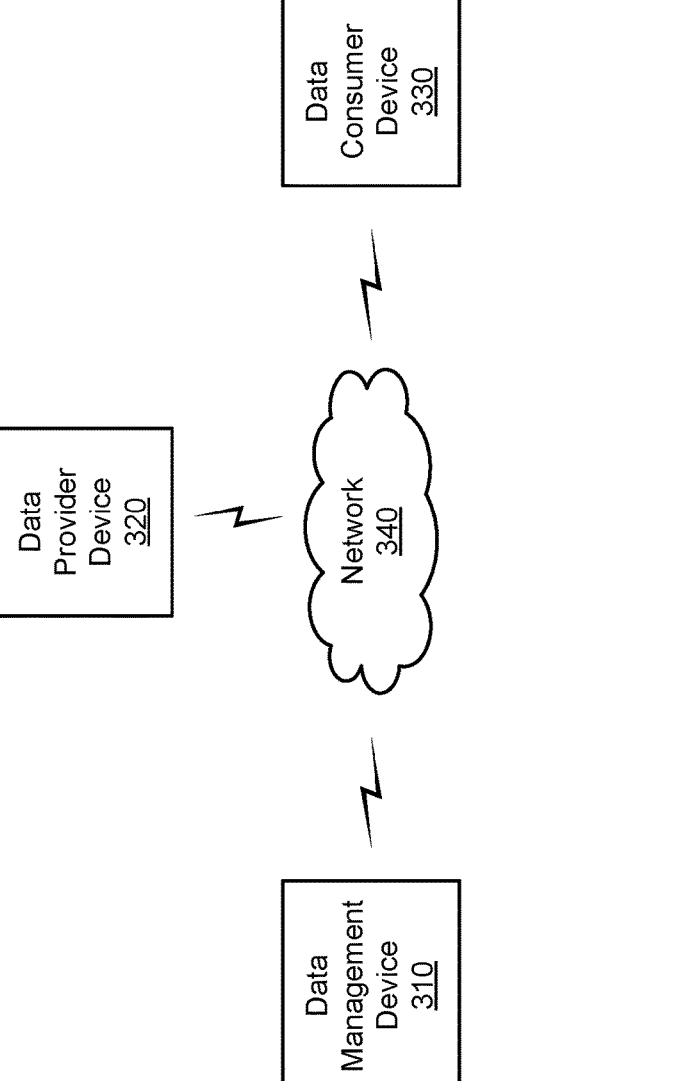
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a data management device 310, a data provider device 320, a data consumer device 330, and/or a network 340. Devices of environment 300 may interconnect via wired connections, wireless connections, or a combination of wired and wireless connections.

The data management device 310 may include one or more devices capable of receiving, generating, storing, processing, providing, and/or routing information associated with obfuscating user data via differential privacy, as described elsewhere herein. The data management device 310 may include a communication device and/or a computing device. For example, the data management device 310 may include a server, such as an application server, a client server, a web server, a database server, a host server, a proxy server, a virtual server (e.g., executing on computing hardware), or a server in a cloud computing system. In some implementations, the data management device 310 may include computing hardware used in a cloud computing environment.

The data provider device 320 may include one or more devices capable of receiving, generating, storing, processing, and/or providing information associated with obfuscating user data via differential privacy, as described elsewhere herein. The data provider device 320 may include a communication device and/or a computing device. For example, the data provider device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), a server, and/or a similar type of device.

The data consumer device 330 may include one or more devices capable of receiving, generating, storing, processing, providing, and/or routing information associated with obfuscating user data via differential privacy, as described elsewhere herein. The data consumer device 330 may include a communication device and/or a computing device. For example, the data consumer device 330 may include a server, such as an application server, a client server, a web server, a database server, a host server, a proxy server, a virtual server (e.g., executing on computing hardware), or a server in a cloud computing system. In some implementations, the data consumer device 330 may include computing hardware used in a cloud computing environment.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
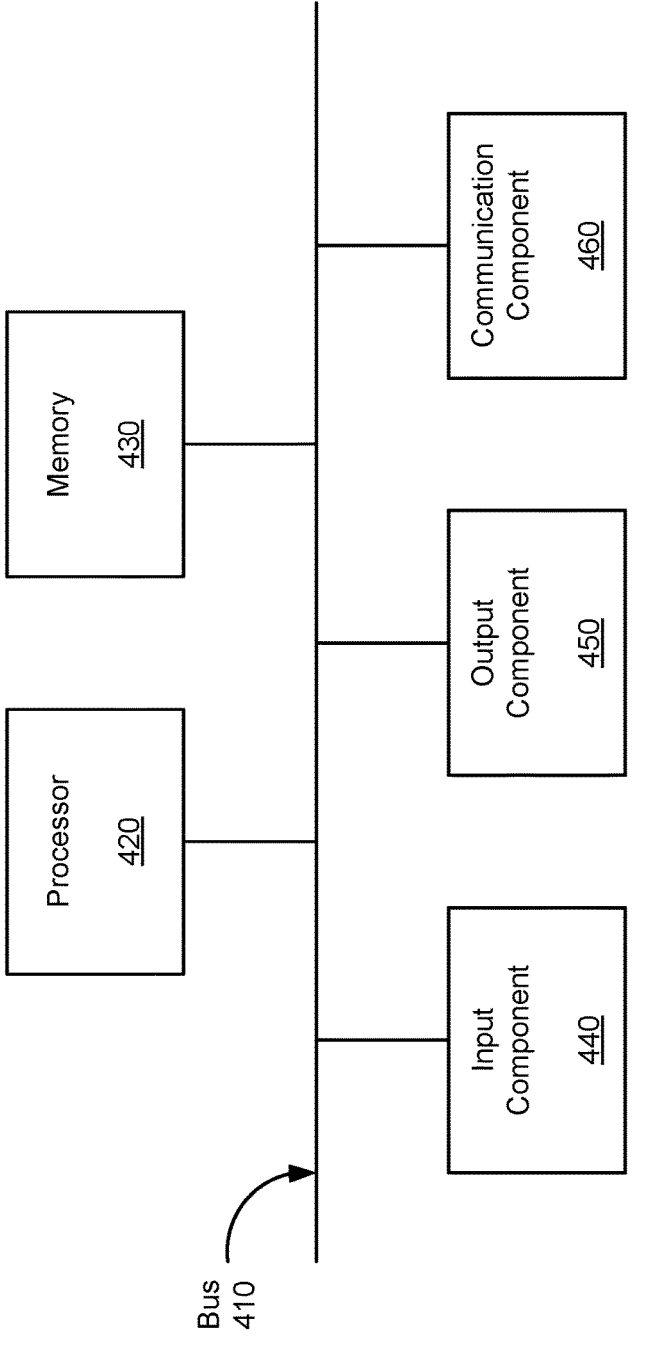
FIG. 4 is a diagram of example components of a device associated with obfuscating user data via differential privacy, in accordance with some embodiments of the present disclosure.

FIG. 4 is a diagram of example components of a device 400 associated with obfuscating user data via differential privacy. The device 400 may correspond to the data management device 310, the data provider device 320, and/or the data consumer device 330. In some implementations, the data management device 310, the data provider device 320, and/or the data consumer device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with obfuscating user data via differential privacy. In some implementations, one or more process blocks of FIG. 5 may be performed by the data management device 310. In some implementations, one or more process blocks of FIG. 5 may be performed by another device or a group of devices separate from or including the data management device 310, such as the data provider device 320 and/or the data consumer device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a request for data (block 510). For example, the data management device 310 (e.g., using processor 420, memory 430, input component 440, and/or communication component 460) may receive a request for data, as described above in connection with reference number 115 of FIG. 1A. In some implementations, the request is associated with one or more parameters. As an example, the request for data may indicate requested data, a request type, and/or an accuracy level of the requested data, among other examples.

As further shown in FIG. 5, process 500 may include obtaining, based on receiving the request, the data (block 520). For example, the data management device 310 (e.g., using processor 420 and/or memory 430) may obtain, based on receiving the request, the data, as described above in connection with reference number 130 of FIG. 1B. As an example, the data management device 310 may search for or otherwise obtain the data indicated by the request (e.g., true data or exact data).

As further shown in FIG. 5, process 500 may include generating, using the data, differentially private data via a differential privacy function that uses a privacy parameter to control a level of noise that is inserted into the data to generate the differentially private data (block 530). For example, the data management device 310 (e.g., using processor 420 and/or memory 430) may generate, using the data, differentially private data via a differential privacy function that uses a privacy parameter to control a level of noise that is inserted into the data to generate the differentially private data, as described above in connection with reference number 135 of FIG. 1C. As an example, the privacy parameter may be based on the request and/or one or more permissions associated with the data. In some implementations, the privacy parameter is based on the one or more parameters. For example, the data management device 310 may determine the privacy parameter to cause differentially private data to have a given accuracy level.

As further shown in FIG. 5, process 500 may include providing, in response to the request, the differentially private data (block 540). For example, the data management device 310 (e.g., using processor 420 and/or memory 430) may provide, in response to the request, the differentially private data, as described above in connection with reference number 140 of FIG. 1C. As an example, the data management device 310 may provide the differentially private data to the data consumer device 330. As another example, the data management device may provide the differentially private data as an input to a machine learning model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C and/or 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for obfuscating user data via differential privacy, the system comprising:
   one or more memories; and
   one or more processors, communicatively coupled to the one or more memories, configured to:
      receive, from a data consumer, a request for data, wherein:

the request is associated with one or more parameters that specify one or more conditions for allowing access to the data, the one or more parameters comprise a category associated with the data consumer and a purpose for accessing the data, the category associated with the data consumer comprises a trusted entity or a non-trusted entity, and the request indicates the purpose for accessing the data;

obtain, based on receiving the request, the data;

determine, based on the one or more parameters, a privacy parameter associated with defining an accuracy level of differentially private data as compared to the data;

obfuscate the data via a differential privacy function that uses the privacy parameter to control a level of noise that is inserted into the data to generate the differentially private data, wherein:

the differentially private data is different than the data and is representative of the data within the accuracy level, and the trusted entity is allowed to access data with less inserted noise than the non-trusted entity; and provide, in response to the request, the differentially private data.

2. The system of claim 1, wherein the one or more parameters include at least one of:

a request type associated with the request, the category associated with the data consumer, or a permission level associated with the data consumer.

3. The system of claim 1, wherein the data includes qualitative data, and wherein the one or more processors, to obfuscate the data, are configured to:

generate, using the qualitative data, qualitative differentially private data that is different than the qualitative data, wherein a difference between the qualitative data and the qualitative differentially private data satisfies an accuracy threshold, and wherein the accuracy threshold is based on at least one of the privacy parameter or the accuracy level.

4. The system of claim 3, wherein the qualitative data includes a location identifier, and wherein the one or more processors, to obfuscate the data, are configured to:

perform, using the location identifier, a lookup operation to identify one or more candidate location identifiers, wherein the one or more candidate location identifiers are associated with respective geographic locations, and wherein a distance between the respective geographic locations and a geographic location associated with the location identifier satisfies the accuracy threshold; and select a differentially private location identifier, from the one or more candidate location identifiers, to be included in the differentially private data.

5. The system of claim 3, wherein the qualitative data includes a vendor name, and wherein the one or more processors, to obfuscate the data, are configured to:

determine a category associated with the vendor name; and

generate a generic name, associated with the category associated with the vendor name, to be included in the differentially private data in place of the vendor name.

6. The system of claim 1, wherein the request for the data includes a request for one or more statistical parameters associated with the data, and wherein the one or more processors, to obfuscate the data, are configured to:

calculate, using the data, the one or more statistical parameters; and obfuscate the one or more statistical parameters via the differential privacy function to generate one or more differentially private statistical parameters to be included in the differentially private data.

7. The system of claim 1, wherein the one or more processors are further configured to:

determine whether the request is permissible based on at least one of:

the one or more parameters, information associated with the data consumer, or one or more permissions associated with an owner of the data, and wherein obtaining the data is based on determining that the request is permissible.

8. The system of claim 1, wherein the one or more processors, to provide the differentially private data, are configured to:

provide the differentially private data as an input to a machine learning model.

9. The system of claim 1, wherein:

the data consumer is permitted to access more accurate data for a first type of purpose than for a second type of purpose, wherein the first type of purpose comprises machine learning model training and the second type of purpose comprises credit checking.

10. A method of obfuscating user data via differential privacy, comprising:

receiving, by a device, a request for data, wherein:

the request is associated with one or more parameters that specify one or more conditions for allowing access to the data, the one or more parameters comprise a category associated with a data consumer and a purpose for accessing the data, the category associated with the data consumer comprises a trusted entity or a non-trusted entity, and the request indicates the purpose for accessing the data;

obtaining, by the device and based on receiving the request, the data;

generating, by the device and using the data, differentially private data via a differential privacy function that uses a privacy parameter to control a level of noise that is inserted into the data to generate the differentially private data, wherein:

the privacy parameter is based on the one or more parameters, and the trusted entity is allowed to access data with less inserted noise than the non-trusted entity; and providing, by the device and in response to the request, the differentially private data.

11. The method of claim 10, further comprising:

determining, based on the one or more parameters, the privacy parameter associated with defining an accuracy level of the differentially private data as compared to the data.

12. The method of claim 10, wherein the differentially private data is different than the data and is representative of the data.

13. The method of claim 10, wherein the one or more parameters include the purpose for accessing the data, and wherein the purpose for accessing the data comprises a purpose associated with a financial process.

14. The method of claim 10, wherein the data includes a location identifier associated with a geographic location, and wherein generating the differentially private data comprises:

searching a location database using the location identifier to identify one or more candidate location identifiers, wherein the one or more candidate location identifiers are associated with respective geographic locations, wherein a distance between the respective geographic locations and the geographic location satisfies a distance threshold, and wherein the distance threshold is based on the privacy parameter; and selecting a differentially private location identifier, from the one or more candidate location identifiers, to be included in the differentially private data.

15. The method of claim 14, wherein the location identifier is a zone improvement plan (ZIP) code.

16. The method of claim 10, wherein the noise that is inserted into the data includes one or more modifications to the data.

17. The method of claim 10, wherein the data includes identifying information associated with a user or an entity, and wherein generating the differentially private data comprises:

generating, based on a category associated with the identifying information, generic identifying information that identifies the category associated with the identifying information, wherein the differentially private data includes the generic identifying information in place of the identifying information.

18. A non-transitory computer-readable medium storing a set of instructions, the set of instructions comprising:

one or more instructions that, when executed by one or more processors of a device, cause the device to:

receive a request for data, wherein:

the request is associated with a data consumer and one or more parameters that specify one or more conditions for allowing access to the data,

the one or more parameters comprise a category associated with the data consumer and a purpose for accessing the data, the category associated with the data consumer comprises a trusted entity or a non-trusted entity, and the request indicates the purpose for accessing the data;

obtain, based on receiving the request, the data;

determine, based on the one or more parameters, a privacy parameter associated with defining an accuracy level of differentially private data as compared to the data; and obfuscate the data via a differential privacy function that uses the privacy parameter to control a level of noise that is inserted into the data to generate the differentially private data, wherein:

the differentially private data is different than the data and is representative of the data within the accuracy level, and the trusted entity is allowed to access data with less inserted noise than the non-trusted entity; and provide, in response to the request, the differentially private data.

19. The non-transitory computer-readable medium of claim 18, wherein the data includes qualitative data, and wherein the one or more instructions, that cause the device to obfuscate the data, cause the device to:

generate, using the qualitative data, qualitative differentially private data that is different than the qualitative data, wherein a difference between the qualitative data and the qualitative differentially private data satisfies an accuracy threshold, and wherein the accuracy threshold is based on at least one of the privacy parameter or the accuracy level.

20. The non-transitory computer-readable medium of claim 18, wherein the request for the data includes a request for one or more statistical parameters associated with the data, and wherein the one or more instructions, that cause the device to obfuscate the data, cause the device to:

calculate, using the data, the one or more statistical parameters; and obfuscate the one or more statistical parameters via the differential privacy function to generate one or more differentially private statistical parameters to be included in the differentially private data.

* * * * *